«12» United States Patent
Borzycki et al.

(10) Patent No.: US 8,266,688 B2
(45) Date of Patent: Sep. 11, 2012

(54) SYSTEMS AND METHODS FOR ENHANCING SECURITY BY SELECTIVELY OPENING A LISTENING PORT WHEN AN INCOMING CONNECTION IS EXPECTED

(75) Inventors: Andrew Gerard Borzycki, Killara (AU); Nicholas Alexander Bissett, Forest Lodge (AU); Donovan Ross Hackett, Epping (AU); Michael John Wookey, Epping (AU); Richard Jason Croft, Wollstonecraft (AU); Jeffrey Dale Muir, Logan Village (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 940 days.

(21) Appl. No.: 11/875,256

(22) Filed: Oct. 19, 2007

(65) Prior Publication Data

US 2009/0106834 A1 Apr. 23, 2009

(51) Int. Cl.
*H04L 29/06* (2006.01)
(52) U.S. Cl. .............................. 726/14; 726/12; 709/229
(58) Field of Classification Search .................... None
See application file for complete search history.

(56) References Cited

U.S. PATENT DOCUMENTS

| | | | | |
|---|---|---|---|---|
| 6,463,418 | B1 * | 10/2002 | Todd ............................ | 705/26.8 |
| 6,643,683 | B1 * | 11/2003 | Drumm et al. ................ | 709/203 |
| 6,983,319 | B1 * | 1/2006 | Lu et al. ........................ | 709/223 |
| 2002/0026590 | A1 * | 2/2002 | Kusunoki ...................... | 713/201 |
| 2003/0065950 | A1 | 4/2003 | Yarborough | |
| 2004/0250130 | A1 * | 12/2004 | Billharz et al. ............... | 713/201 |
| 2005/0240758 | A1 * | 10/2005 | Lord et al. .................... | 713/153 |
| 2006/0036847 | A1 * | 2/2006 | Bush et al. .................... | 713/153 |
| 2006/0179306 | A1 * | 8/2006 | Kikkoji et al. ................ | 713/168 |
| 2008/0120691 | A1 * | 5/2008 | Flewallen et al. ................. | 726/1 |
| 2009/0100518 | A1 * | 4/2009 | Overcash ......................... | 726/22 |
| 2009/0205039 | A1 * | 8/2009 | Ormazabal et al. ............. | 726/11 |

FOREIGN PATENT DOCUMENTS

EP 1484894 12/2004

OTHER PUBLICATIONS

International Search Report from PCT/US2008/080148, mailed Apr. 15, 2009.
Postel, et al., "File Transfer Protocol (FTP); rfc959.txt".
Written Opinion of the International Searching Authority from PCT/US2008/080148, mailed Apr. 15, 2009.

* cited by examiner

*Primary Examiner* — Nathan Flynn
*Assistant Examiner* — Michael R Vaughan
(74) *Attorney, Agent, or Firm* — Foley and Lardner LLP; Christopher J. McKenna

(57) ABSTRACT

The present solution reduces the attack surface of a server by selectively opening a server port for listening when a client has been authenticated/authorized via another machine or process, and directed to connect to the server in question. When not selectively listening on a port, the server does not listen or open ports for connections or otherwise minimizes the number of open ports. By selectively listening for connections, the server reduces the opportunity for hackers to attack the server process, and improves the security of the server. The ability to selectively listen on a port at specific times may be combined with additional meta information—like ticketing and prior authentication information to help further secure the server. The meta information may identify and ensure that only the correct remote endpoint is allowed to connect via the port. Instead of first listening for connections and then authenticate and authorize the received connection as with typical servers, the present solution first authenticates/ authorizes a connection via another machine or process, then listens for an expected and authorized connection.

22 Claims, 8 Drawing Sheets

SYSTEMS AND METHODS FOR ENHANCING SECURITY BY SELECTIVELY OPENING A LISTENING PORT WHEN AN INCOMING CONNECTION IS EXPECTED

FIELD OF THE INVENTION

The present application generally relates to data communication networks. In particular, the present application relates to systems and methods for selectively listening on a port for expected authorized connection requests.

BACKGROUND OF THE INVENTION

Server processes generally listen on ports for incoming connections, such as transport control protocol connection requests from a client. The server may have processes listening for requests on multiple ports of the server. Typically, the server listens on these ports for connections on a continuous basis during the lifetime of the server. Having a port open for a server increases the attack surface of a server. An open port may provide a hacker another process upon which an attack may be mounted by sending bad network packets. The more ports that are open further increases the attack surface of the server for which to mount attacks.

BRIEF SUMMARY OF THE INVENTION

The present solutions reduces the attack surface of a server by selectively opening a server port for listening when a client has been authenticated/authorized via another machine or process, and directed to connect to the server in question. When not selectively listening on a port, the server does not listen or open ports for connections or otherwise minimizes the number of open ports. By selectively listening for connections, the server reduces the opportunity for hackers to attack the server process, and improves the security of the server. The ability to selectively listen on a port at specific times may be combined with additional meta information—like ticketing and prior authentication information to help further secure the server. The meta information may identify and ensure that only the correct remote endpoint is allowed to connect via the port. Instead of first listening for connections and then authenticating and authorizing the received connection as with typical servers, the present solution first authenticates/authorizes a connection via another machine or process, then listens for an expected and authorized connection.

In one aspect, the present invention is related to a method for improving security of a device by selectively listening on a port for a connection request in response to a signal identifying an expected authorized connection request. The method includes establishing a first process on a first device for receiving incoming connections via a port. The first process is disabled from listening for incoming connections via the port. The first process receives a signal from a second process indicating a request of a second device to connect to the first device is authorized. In response to receiving the signal, the first process enables listening for an incoming connection request on the port. In response to receiving a connection request via the port, the first process or a second process determines whether or not the received connection request corresponds to information identifying the authorized connection request of the second device.

In some embodiments, the method includes determining by the first process prior to accepting a connection for the received connection request that the received connection request corresponds to the information, and accepting the received connection request in response to the determination. In other embodiments, the method includes determining by the first process prior to accepting a connection for the received connection request that the received connection request does not correspond to the information, and dropping or otherwise not accepting the received connection request in response to the determination. In another embodiment, the method includes the first process determining after accepting a connection for the received connection request that the received connection request corresponds to the information and in response to the determination, maintaining the connection. In one embodiment, the method also includes determining, after accepting a connection for the received connection request, that the received connection request corresponds to the information and in response to the determination dropping the connection.

A second process on either the first device or a third device may receive a request from the second device to connect to the first device. The second process may authenticate the connection request and determine that the second device is authorized or allowed to connect to the first device. The second process may communicate the signal to the first process in response to this determination.

In one embodiment, the method includes listening by the first process on the port until the connection request is received. Upon receipt of the connection request, the first process may disable listening on the port. In some embodiments, the first process listens on the port until an expiration of a predetermined time period. The first process may receive information comprising a ticket from the second device. For example, the first process may accept a connection request and receive the ticket via the connection established for the accepted connection request. The first process or a second process compares a second ticket of the received connection request with the ticket. In response to the comparison, the first process may determine to maintain the connection established for the received connection request if the second ticket and the ticket match. In another embodiment, the first process may determine to drop the connection if the second ticket and the ticket do not match.

In another aspect, the present invention is related to a system for improving security of a device by selectively listening on a port for a connection request in response to a signal identifying an expected authorized connection request. The system includes a first process on a first device for receiving incoming connections via a port. The first process is disabled from listening for incoming connections via the port. The first process may include a receiver for receiving a signal indicating a request from a second device to connect to the first device is authorized. The first process also includes a listener to listen for an incoming connection on the port in response to receiving the signal. The system may include a comparator to determine information of a connection request received on the port corresponds to information identifying the authorized connection request of the second device In some embodiments, the first process determines prior to accepting the received connection request that the received connection request corresponds to the information, and accepts a connection for the received connection request in response to the determination. In other embodiments, the first process determines prior to accepting the received connection request that the received connection request does not correspond to the information, and in response to the determination drops the received connection request. In another embodiment, the first process determines after accepting a connection for the received connection request that the received connection request corresponds to the information and in response to the determination maintains the connection. In one embodiment, the first process determines after accepting a connection for the received connection request that the received connection request does not correspond to the information and in response to the determination drops the connection.

The system may include a second process on the first device or a third device. The second process may receive the request from the second device to connect to the first device. The second process may authenticate the connection request of the second device and determine that the second device is authorized to connect to the first device. In response to this determination, the second process communicates the signal to the first process. The second process on the first device or a second device may include the comparator.

In another embodiment of the system, the listener of the first process listens on the port until the connection request is received or an expiration of a predetermined time period. Upon receipt of the connection request, the system may disable the listener. In one embodiment, the receiver receives information comprising a ticket for the second device. The system via the comparator compares a second ticket of the received connection request with the ticket. In some cases, the first process communicates the second ticket to the comparator of the first process or a second process. The first process may determine to maintain a connection established for the received connection request if the second ticket and the ticket match or drop the connection if the second ticket and the ticket do not match.

The details of various embodiments of the present invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
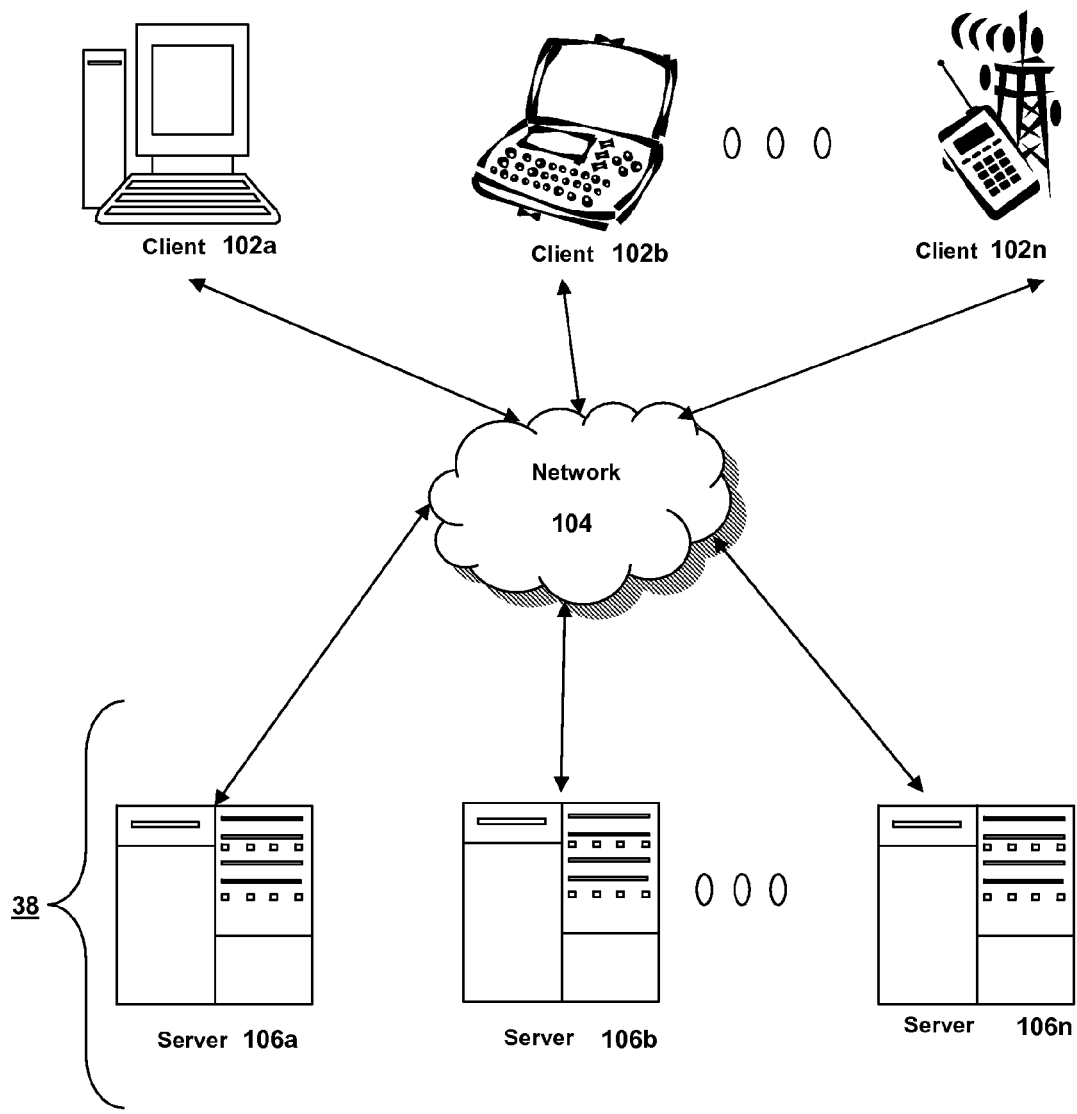
FIG. 1A is a block diagram of an embodiment of a network environment for a client to access a server.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention; and Section B describes embodiments of systems and methods for performing connection management techniques of the present invention.

A. Network and Computing Environment

Prior to discussing the specifics of embodiments of the systems and methods of a connection management system of the present solution, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104).

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 may not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, desktop server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server and/or desktop server providing access to hosted applications/desktops for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications, including desktops hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications and/or desktops available to the client 102 and address information associated with a server 106 hosting an application and/or desktop identified by the enumeration. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
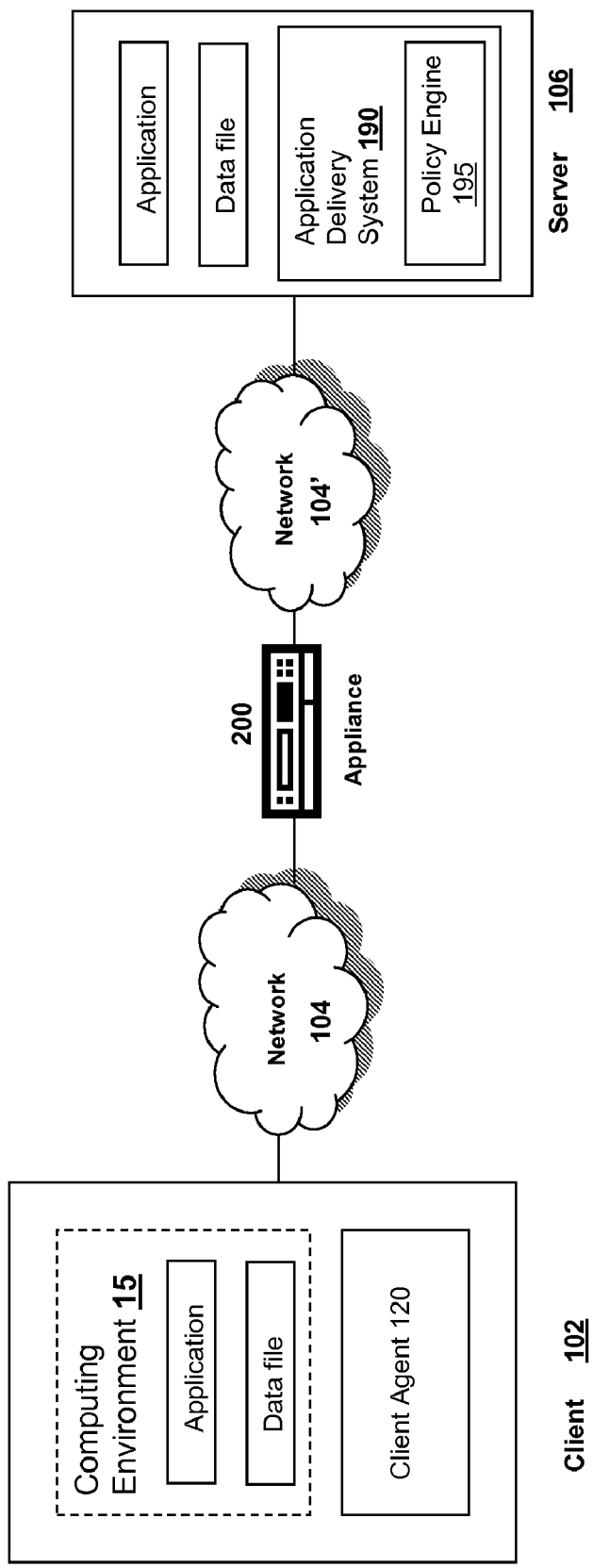
FIG. 1B is a block diagram of another embodiment of a network environment for a client to access a server via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 102 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

As shown in FIG. 1B, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

Although FIG. 1B shows a network 104 and a network 104' between the clients 102 and the servers 106, the clients 102 and the servers 106 may be on the same network 104. The networks 104 and 104' may be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The appliance 200 may accelerate delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL (Secure Socket Layer) VPN connection. It yet other embodiments, the appliance 200 provides application firewall security, control and management of the connection and communications between a client 102 and a server 106.

The application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Presentation Server™ by Citrix Systems, Inc. and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via streaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 102 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Presentation Server™ by Citrix Systems, Inc., and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office Live Meeting provided by Microsoft Corporation of Redmond, Wash.

Figure 1C:
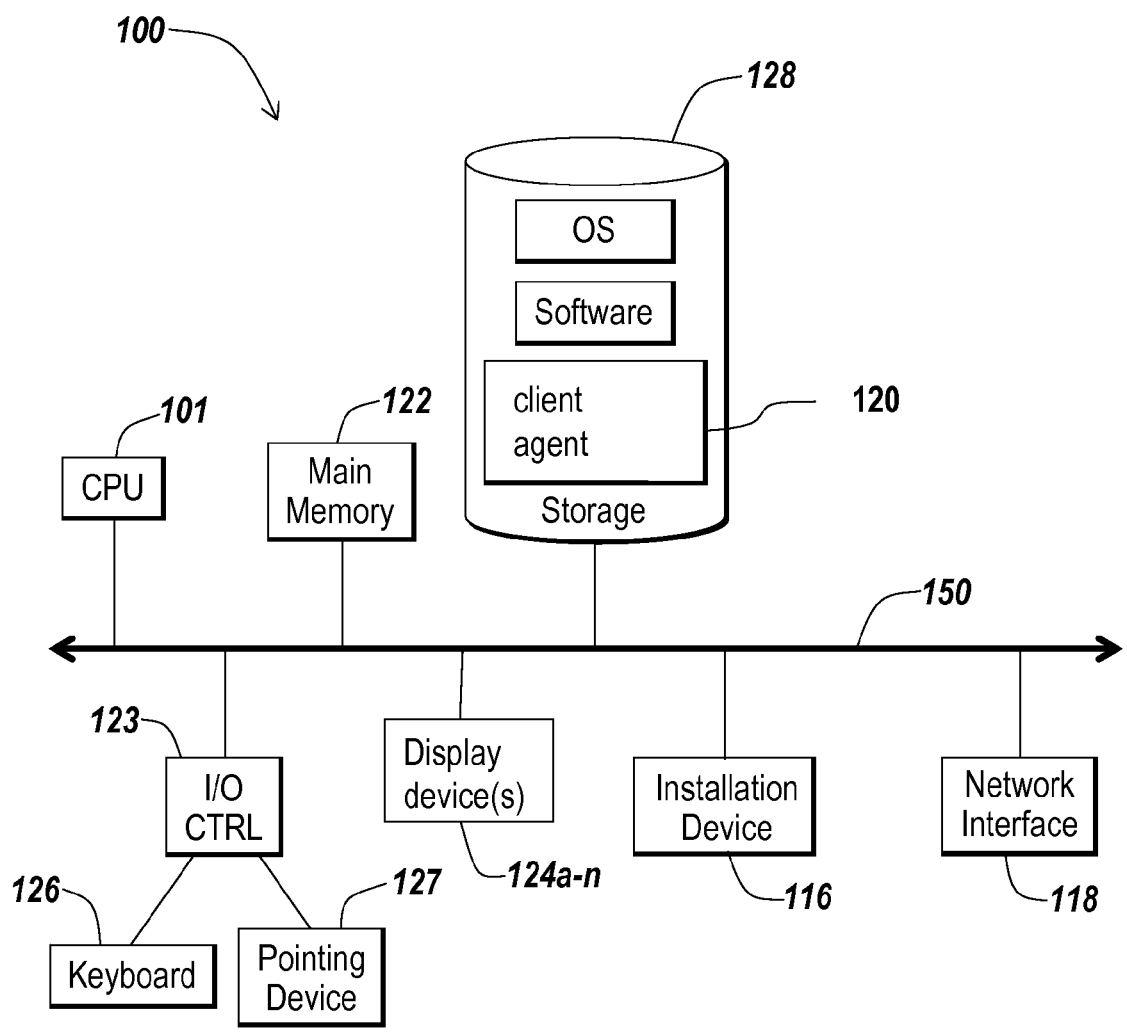
FIGS. 1C and 1D are block diagrams of embodiments of a computing device.
Figure 1D:
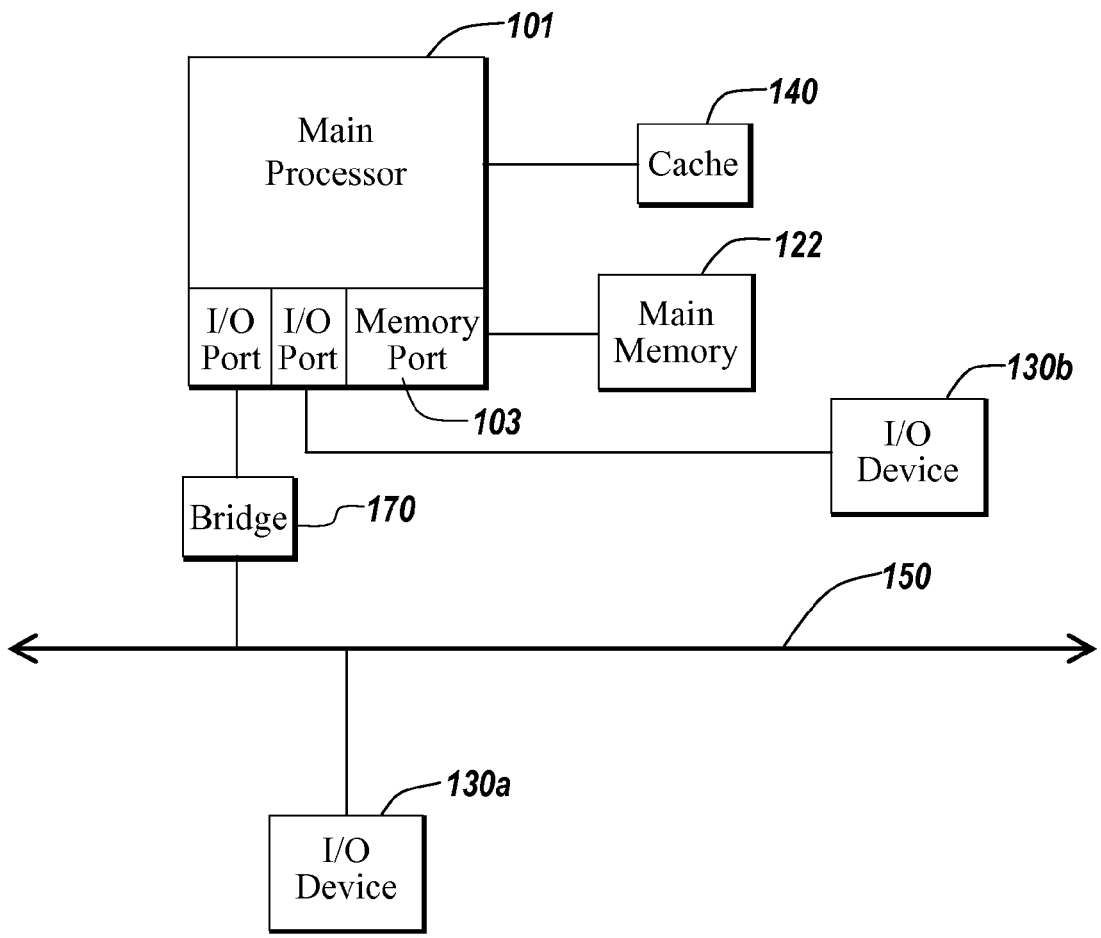

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1D, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as a client agent 120, or portion thereof. The computing device 100 may further comprise a storage device 128, such as one or more hard disk drives or redundant arrays of independent disks, for storing an operating system and other related software, and for storing application software programs such as any program related to a first process or a second process, such as any of those elements described in connection FIGS. 2A-2C. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Connection Management System

Figure 2A:
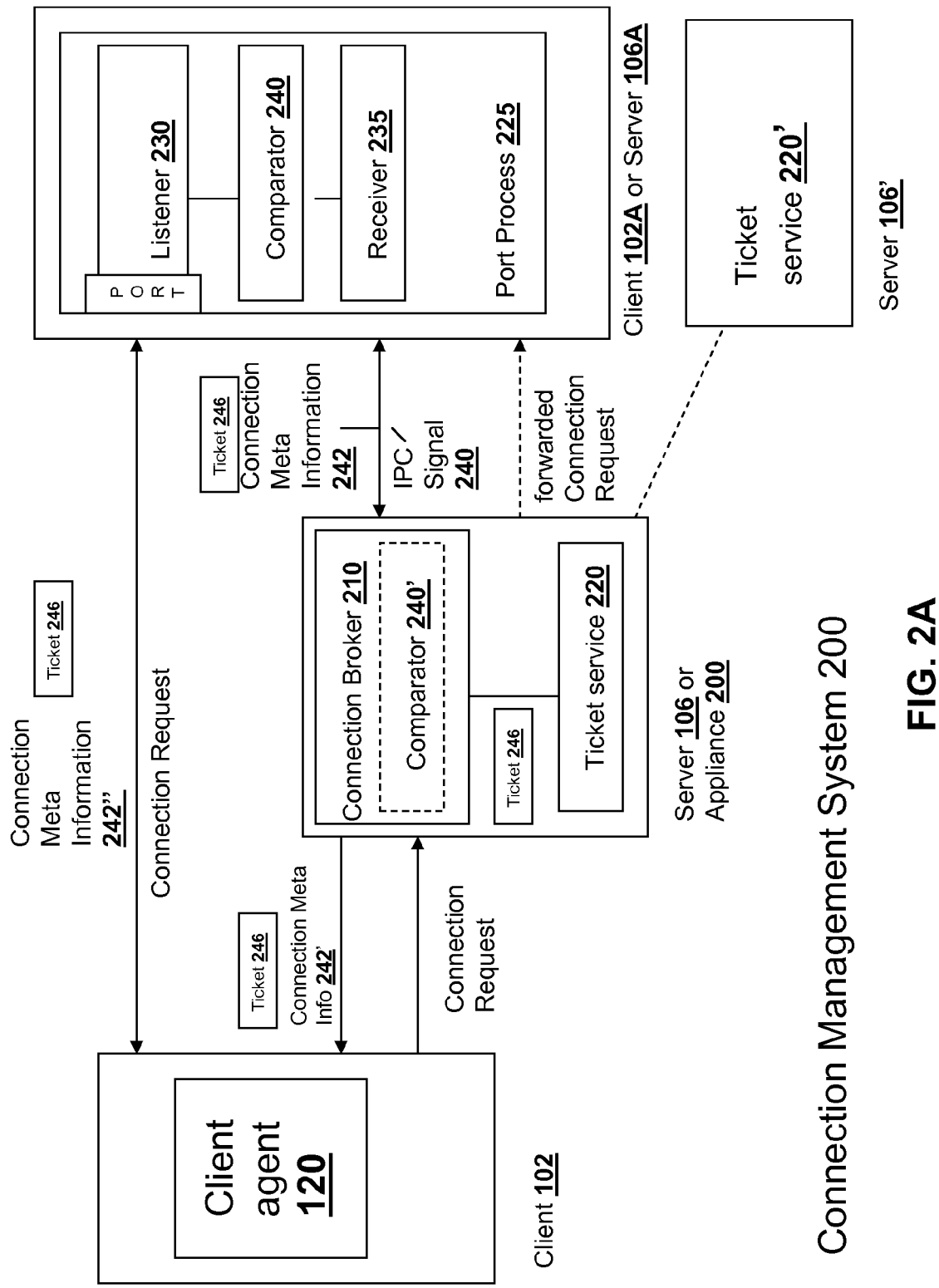
FIG. 2A is a block diagram of an embodiment of a system for establishing connections between devices.

FIG. 2A depicts an embodiment of a connection management system 200. The connection management system 200 described below may used to selectively listen on a port for incoming and expected connection requests, such as transport layer connection request on a TCP port. A first process on a server of the connection management system may initially be disabled from listening on a port for incoming connection requests until a second process communicates a signal to the first process to listen for an expected connection from a client. The second process may first authenticate and/or authorize a connection request from a client to the server. If the connection request is authorized by the second process, the first process is enabled to listen on the port in response to receiving the signal.

The connection management system 200, in some cases, combines connection meta information with the selective listening technique to further secure the server. Connection meta information may include ticketing and prior authentication with another server. The first process may use this meta information to determine whether or not the connection requested by the client should be established. If the connection meta information corresponds to the connection request, such as a received ticket, the first process may establish the connection. In one case, the first process may drop the connection request and disable listening on the port until another signal is received from the second process. In other cases, the first process may drop the unauthorized connection request and continue listening for the authorized connection request.

In brief overview of FIG. 2A., the system 200 may include a client 102 having a client agent 120. The client 102 as a first computing device may request a connection to a second computing device, such as client 102A or server 106A. An appliance 200 or server 106 may receive the connection request for the second device and process the request via a connection broker 210, e.g., a second process. The connection broker 210 may authenticate and authorize the request to the second device. In response to authorizing the connection request, the connection broker 210 generates meta information 242 identifying the connection which may include a ticket 246. For example, the connection broker 210 may obtain a ticket 246 from any ticket service 220, 220'. The connection broker 210 communicates this information 242' to the client 102. The client agent 120 may use the connection information 242" to send a connection request to the port of the second device. Upon authorizing the connection request to the second device, the connection broker 210 communicates a signal 240 to a second process of a port listening process 225 of the second device.

The port listening process 225 of the second device includes a port listener 230 and a receiver 235. The port process 225 may be established as a running process or device driver. By default or otherwise, the port listener 230 may be disabled from listening on a port until receiving a signal from another process, such as the connection broker 210. Upon receiving a signal 240 from the connection broker 210 via a receiver 235, the port process 225 may enable the listener 230 to listen for incoming connection requests on the port, such as the connection request authorized by the connection broker 210. The listener 230 receives the connection request from the client 102. The listener 230 may also receive connection information 242", which may include a copy of the ticket 246. In some cases, the comparator 240 of the listener process 225 compares the information 242" received by the listener 230 to determine if the received connection request corresponds to the expected connection requested authorized via the connection broker 210. In other cases, the listener process 225 communicates the connection information 242" to the connection broker 210 to determine if the received connection request corresponds to the expected connection request authorized via the connection broker 210. If the connection request is as expected, the port process 225 establishes or maintains the requested connection. Otherwise, the port process 225 drops the connection request or the connection.

The connection broker 210 may include software, hardware or any combination of software and hardware. The connection broker 210 may include an application, program, library, service, task, process, thread or any type and form of executable instructions. In one embodiment, the connection broker 210 resides or executes on a server 106. In another embodiment, the connection broker 210 executes or operates as part of or on an appliance 200. In one embodiment, the connection broker 210 receives connection requests from client and transmits information to the client 102 to identify a device to which the client transmits the connection request. In some embodiments, the connection broker 210 operates or acts as a proxy. In one embodiment, the connection broker 210 may operate as a transparent proxy. In another embodiment, the connection broker 210 may operate as a reverse proxy. In other embodiments, the connection broker 210 intercepts requests from a client directed to another device. For example, the connection broker 210 may be deployed in-line between client 102 and server 106A. The connection broker 210 may forward the connection request to the device to be connected to.

The connection broker 210 may receive requests from an end point device or client 102 to connect to or establish sessions with another device, such as a server 106 in a server farm or another client 102A. In one embodiment, the connection broker 210 receives a transport layer connection request from a client 102 to establish a connection with the client 102A or server 106A. For example, the client 102 may request a UDP connection. In various embodiments, the client requests a TCP connection. In another embodiment, the connection broker 210 receives any type and form of application layer request to establish a session with the client 102A or server 106A. For example, the client 102 may request an SSL session or an HTTP session. In another example, the client 102 such as via client agent 120 may request any type and form of remote session or remote display protocol session, such as an ICA session or an RDP session. In some embodiment, the client agent 120 communicates the connection request to the connection broker 210.

The connection broker 210 may use any type and form of authentication and authorization system and policies to authenticate and/or authorize the client 102 or user of the client 102 to connect to the requested device. In some embodiments, the connection broker 210 receives authentication credentials of a user of the client 102 and validates the credentials. In one embodiment, the connection broker 210 validates the authentication credentials with a database, a server, LDAP directory service or any type and form of authentication service accessible via the network 104. In some embodiments, the connection broker 210 determines the authentication credentials are incomplete, invalid or otherwise do not authenticate the user. In other embodiments, the connection broker 210 authenticates the user based on a policy via a policy engine, such as the policy engine 195 of the application delivery system 190. In one embodiment, the connection broker 210 authenticates the user via a ticket service 220.

In one embodiment, the connection broker 210 receives a certificate from the client 102. The connection broker 210 may check if the certificate is from a valid or expected issuer or otherwise has valid or expected content. In another embodiment, the connection broker 21 validates the certificate with any authentication credentials or user profiles. In some embodiments, the connection broker 210 uses a third-party service, host or server to validate the certificate. In other embodiments, the connection broker 210 validates the certificate with a ticket service 220. In one embodiment, the connection broker 210 acts a certificate authority or issuer for client certificates, and validates the received certificate against a database. In some embodiments, the connection broker 210 determines if the certificate is otherwise intact, complete or without error.

The connection broker 210 may use any type and form of information about the client 102 to authenticate and/or authorize the client device 102 to connect to the requested device. The connection broker 210 may receive information from the client agent 120. In some embodiments, the client agent 120 comprises a collection agent or otherwise performs collection of information about the client. In one embodiment, the client agent 120 comprises an end-point detection and scanning mechanism, which identifies and determines one or more attributes or characteristics of the client. For example, the client agent 120 may identify and determine any one or more of the following client-side attributes: 1) the operating system an/or a version of an operating system, 2) a service pack of the operating system, 3) a running service, 4) a running process, and 5) a file. The client agent 120 may also identify and determine the presence or versions of any one or more of the following on the client: 1) antivirus software, 2) personal firewall software, 3) anti-spam software, and 4) internet security software. A policy engine of or used by the connection broker 210 may have one or more authentication and/or authorization policies based on any one or more of the attributes or characteristics of the client or client-side attributes.

The connection broker 210 may generate or otherwise provide connection meta information 242 for a connection request. The connection meta information 242 may include any type and form of information to identify the connection request. The connection meta information 242 may include a file, such as an ICA file. For example, the connection meta information 242 may include any of the following: user id, password, transport driver, name or IP address of application server, name of published application, or any working or program directories, etc. In another embodiment, the connection meta information 242 may include information identifying the device for which to connect, such as a host identifier, host name, IP address and/or port number. In some embodiments, the connection meta information 242 may uniquely identify the connection request. The connection meta information 242 may include any portion of the header, fields or payload of the network packet, such as source and/or destination addresses and ports. In one embodiment, the connection meta information 242 includes one or more tickets or is otherwise associated with one or more tickets 246. In another embodiment, the connection meta information 242 may include any type and form of authentication and/or authorization information. In other embodiments, the connection meta information 242 may include any client-side attributes, such as attributed provided or detected by the client agent 120.

In one embodiment, the connection broker 210 generates the connection meta information 242 upon receipt of the connection request. In another embodiment, the connection broker 210 generates the connection meta information 242 upon authentication and/or authorization of the request. In other embodiments, the connection broker 210 generates the connection meta information 242 upon receipt of a ticket for the connection from the ticket service 220, 220'. As will be described herein, the connection broker 210 may communicate the connection meta information 242 to the requesting device, such as client 102. For example, the connection broker 210 may identify to the requesting client 102 via the meta information 242 what device to connect to and/or how to connect to the device. The connection broker 210 may also communicate the connection meta information 242 to the device to which the client requests connection, such as client 102A or server 106A.

A ticket service 220 may include software, hardware or any combination of software and hardware. The ticket service 220 may include an application, program, library, service, task, process, thread or any type and form of executable instructions. In one embodiment, the ticket service 220 may reside or operate on the same device as the connection broker 210, such as server 106. In some embodiments, the connection broker 210 may include the ticket service 220. In another embodiment, the ticket service 220 may reside or operate on a separate device, such as server 106'.

The ticket service 220 may provide authentication services and/or provide one or tickets for use in establishing connections via the connection management system 200. A ticket service generates and validates tickets for connection and authentication purposes. In one embodiment, the ticket service 220 may receive authentication credentials and/or certificate to provide a ticket. A ticket may comprise a session identifier and/or key. The ticket may also comprise a random number, an application server certificate, a constant or null value or any other type of identification, confidential or security based information that may be used for such purposes. In some embodiments, the ticket service 220 encrypts the ticket. In one embodiment, the ticket service 220 stores information about the connection request in association with a generated ticket. For example, the ticket service 220 may store encrypted authentication credentials communicated to the ticket service 220 by the connection broker 210.

Also as depicted in FIG. 2A, a first process or port process 225 may reside or operate on the device to which the client requests a connection. The port process 225 may include software, hardware or any combination of software and hardware. The port process 225 may include an application, program, library, service, task, process, thread or any type and form of executable instructions. The port process 225, or any portion thereof may operate on any layer of a network stack. In one embodiment, the port process 225 or any portion thereof operates in kernel mode. In other embodiments, the port process 225 or any portion thereof operates in user mode. In yet another embodiment, a first portion of the process 225 operates in kernel mode while another portion operates in user mode.

The port process 225 may include a listener 230 for listening on a port of the device 100. The listener 230 may include any type and form of driver, software, or program for listening for, accepting, establishing and/or dropping connections via a port of the device. As depicted in FIG. 2A, a device 100, such as client 102A or server 106 may have one or more network ports for transmitting and receiving data over a network. The network port provides a physical and/or logical interface between the computing device and a network 104 or another device 100 for transmitting and receiving network communications. The type and form of network port depends on the type and form of network and type of medium for connecting to the network. The interface to the port may include software, hardware or any combination of software and hardware. A network stack of the device may interface to the port via one or more device drivers.

The listener 230 may include any type and form of application programming interface (API) for listening or waiting for any type and form of connection request. In one embodiment, the listener 230 includes any type and form of socket based communication API. In some embodiments, the listener 230 is designed, constructed or adapted to listen for and establish any type and form of transport layer connection via a port, such as a TCP or UDP connection. The listener 230 may listen for a connection via a predetermined port. In some embodiments, the listener 230 may listen on a port identified and communicated by another process, such as by the connection broker 210.

The listener 230 may be designed, constructed or adapted to selectively listen on a port for a connection request at a predetermined or signaled time. In some embodiments, the listener 230 does not listen on any ports until specifically communicated to do so from another process. For example, although the port process 225 may execute or otherwise be operational, the port process does not listen via the listener 230 on any ports unless otherwise instructed to do so. In one embodiment, the listener 230 listens for an expected connection request upon receiving a signal from another process. In some embodiments, the listener 230 listens for the connection request upon receipt of information that an authenticated and/or authorized connection request is expected to be received by the device of the listener 230. In yet other embodiments, the listener 230 listens on a port on a predetermined frequency. In one embodiment, the listener 230 listens on a port starting at a predetermined time. In some embodiments, the listener 230 listens on a port for a predetermined time period. In another embodiment, the listener 230 listens on a port until any connection request is received. In one embodiment, the listener 230 listens on a port until an expected connection request is received. For example, the listener 230 may listen on the port until an identified connection request is received, such as connection request authorized by the connection broker 210.

The port process 225 may determine if the connection request is an expected and authorized connection request before or after accepting the connection. In some embodiments, after the listener 230 receives the connection request via the port, the port process 225 and/or listener determines if the connection request is the expected and authorized connection request. For example, the port process may determine from any host name or IP address of the requester whether or not the connection request is the authorized connection request. The port process 225 and/or listener 230 may use any information available from the network packet of the connection request to make this determination. In some cases, this available information is the connection meta information 242" for the connection request.

In other embodiments, after the listener 230 receives the connection request via the port, the port process 225 and/or listener 230 accepts the connection request and establishes the connection. Through the established connection, the port process receives connection meta information 242". In some embodiments, the port process 225 expects to receive the connection meta information 242" as the next communication over the established connection. If the port process 225 does not receive the connection meta information 242" next or within a predetermined time period, the port process 225 may drop the connection. Upon receiving the connection meta information 242" via the established connection, the port process 225 may determine whether or not the connection request and/or connection is the expected and authorized connection request and/or connection. For example, the port process 225 may receive a ticket via the established connection and check the ticket against the expected ticket or with a ticket service 220, 220'.

In some embodiments, the port process 225 provides at least two levels of comparison: i) upon receiving the connection request and prior to accepting the connection and ii) after accepting the connection and receiving connection meta information via the established connection. The port process 225 may check a first level or set of connection meta information, such as an IP address of the connection request upon receiving the connection request via listening. After determining this first set of available connection meta information 242" identifies the authorized connection request, the port process 225 accepts the connection. The port process 225 receives a second level or set of connection meta information 242" via the established connection. If the second set of connection meta information 242" is determined to still identify the authorized connection, the port process 225 maintains the established connection. Otherwise, the port process 225 may drop or discontinue the established connection.

The port process 225 may include a receiver 235 for receiving any communications from another device or process, such as from the connection broker 210. The receiver 235 may include software, hardware or any combination of software and hardware. The receiver 235 may include an application, program, library, service, task, process, thread or any type and form of executable instructions. In some embodiments, the receiver 235 includes any type and form of API for receiving a signal or communication from a connection broker 210. The receiver 235 may be adapted, designed or constructed to receive communications in any type and form of protocol at any layer of a network stack. The receiver 235 may be adapted, designed or constructed to perform any type and form of interprocess communications between the port process 225 and the connection broker or other service, such as any of the IPC signals 240 described below.

The port process 225 as a first process may communicate with the connection broker 210 as a second process via the receiver 235 and an interprocess communication (IPC) signal 240. In some embodiments, the IPC signal 240 may comprise any type and form of control communication channel. In one embodiment, the IPC signal 240 includes any form, implementation or portion of the Windows Communication Foundation programming and services model of the Microsoft Corporation. The IPC signal 240 may include any type and form of pipe communication mechanism. In one case, the IPC signal 240 may be event based and generate events for the port process 225. In another case, the IPC signal 240 may comprise a shared memory IPC mechanism. In some embodiments, the IPC signal 240 may comprise the use of semaphores. In another embodiment, the IPC signal 240 includes any type and form of remote procedure calls. In one embodiment, the IPC signal 240 includes socket based communications.

In yet another embodiment, the IPC signal may include any type and form of messaging. In other embodiments, the connection broker 210 and the port process 225 via the receiver 235 communicate via a TCP or UDP connection. In some embodiments, the connection broker 210 and port process 225 communicate via a secure communication channel, such as via a virtual private network (VPN), secure socket layer (SSL) or Transport Layer Security (TLS). In one embodiment, the connection broker 210 communicates connection meta information 242 to the port process 225 via the IPC signal 240. In another embodiment, the port process 225 communicates via the receiver and/or IPC signal 240 connection meta information 242" received from the client 102.

Still referring to the connection management system 200 of FIG. 2A, a comparator 240, 240' may be used to compare the connection meta information 242, or any portion thereof, generated by the connection broker 210 with the connection meta information 242", or any portion thereof, received by the port process in association with the client's connection request. The comparator 240, 240' may include software, hardware or any combination of software and hardware. A comparator 240 may include an application, program, library, service, task, process, thread or any type and form of executable instructions. In one embodiment, the connection broker 210 includes a comparator 240'. In some embodiments, the port process 225 includes the comparator 240. In another embodiment, a first comparator or a first portion of the comparator operates on the server 106 and a second comparator or a second portion of the comparator operates on the client 102A or server 106A. In other embodiments, the comparator operates on another computing device 100. The comparator 240, 240' may be a separate process from either the connection broker 210 and/or port process 225. In some embodiments, the comparator 240, 240' may be part of the same process of the connection broker 210 and/or port process 225.

The comparator 240 may include logic, functions or operations to compare a first set of connection information 242 to a second set of connection information 242', 242" to determine whether or not the connection information matches or otherwise corresponds. In one embodiment, the comparator 240 expects or determines if a received connection information 242" matched or corresponds to a stored connection information 242. For example, the comparator 240 may determine if connection information 242" for a connection received by the port process 225 matches or corresponds to connection information 242 generated by the connection broker 210 for an authenticated and/or authorized connection request. In one embodiment, the comparator 240 checks or compares a first ticket with a second ticket. For example, the comparator 240 may determine if a ticket received by the client matches or corresponds to the ticket provided by the connection broker 210 to the client 102.

In some embodiments, the comparator 240, 240' receives the connection meta information 242 from any portion of the port process, such as the listener 230. In other embodiments, the port process communicates to the comparator 240 the connection meta information 242" received from the client 102. In another embodiment, the port process received the connection meta information 242 via the IPC signal from the connection broker 210. Upon receipt of the connection meta information 242" from the client's connection request, the comparator 240 of the port process 225 performs the comparison. In yet another embodiment, the port process 225 communicates with a ticket service 220 to validate or verify a ticket from the connection request of the client 102.

In view of embodiments of operation as depicted in FIG. 2A, the connection management system 200 provides a technique for managing connection requests to improve the security of the client 102A or server 106A. The port process 225 may be running on the client 102A or server 106A but the listener 230 is disabled from listening on the port. The client 102 may transmit a connection request to connect to the client 102a or server 106a, such as via the client agent 120. The connection broker 210 receives the connection request and performs authentication and authorization of the request, such as user authentication/authorization and/or end point authorization. If the request is not authorized, the connection request may not be further processed. If the request is authorized, the connection broker 210 generates connection meta information 242, such as a ticket 246. The connection broker 210 may forward information to the client 102, such as to client agent 120, to inform the client to connect to the client 102A or server 106A. The client 102 transmits a connection request to the port of the client 102A or server 106A. The client 102 may provide the connection meta information 242", such as the ticket, obtained via the connection broker 210.

The connection broker 210 transmits a signal 240 to the receiver 235 of the port process 225 to inform the port process 225 of the expected and authorized connection request from the client 102. In some cases, the connection broker 210 communicates the connection meta information 242 to the port process to identify the expected connection request. In response to the signal 204, the port process 225 enables the listener 230 to listen on the port. The listener 230 may listen for a connection request for a predetermined time period and/or until a connection request is received. The listener 230 receives the connection request and meta information from client 102. Upon receipt, the port process 225 may disable the listener 230 from listening on the port.

The port process 225 may determine via a comparator 240 whether or not the received connection request is the connection identified and authorized by the connection broker 210. In some cases, the port process 225 communicates the received connection meta information 242" to the comparator 240. The comparator 240 may be 1) part of the port process 225, 2) on the same device as the port process 225, 3) part of the connection broker 210, 4) on the same device as the connection broker 210, 5) part of a ticket service 220, or 6) otherwise accessible via the network on any device or appliance. The comparator 240 may compare and determine whether or not the received connection meta information 242" matches or corresponds to the connection meta information 242 generated by the connection broker 210. For example, in one embodiment, the comparator 240 compares a ticket received by the port process 225 with the client's connection request to the ticket provided via the connection broker's authorization of the request. If the comparator 240 determines the received connection request is the expected authorized connection identified by the connection broker, the port process establishes the connection. The port process remains executing with the port listener disabled until receiving another signal 240 from the connection broker 210.

Although generally discussed as the connection management system 120 using a single ticket of a ticket service in some embodiments for identifying authenticated and/or authorized connections, a multiple ticket system or multiple ticket techniques may also be used. For example, the ticket service 220 may generate a first ticket for the client and a second ticket for the port process. Upon the port process providing both the first ticket and the second ticket to the ticket service is the connection authorized to be established by the port process 225. In another example, the ticket service 220 may generate multiple tickets for each of the hops between a client 102 and a server 106, such as a connection between the client 102 and an appliance 200, and the connection between the appliance 200 and the server 106. In yet another example, the port process 225 may provide connection meta information received from the client to obtain a ticket from the ticket service 220. If this ticket and a ticket from the client 102 match, then the port process 225 establishes the requested connection.

Figure 2B:
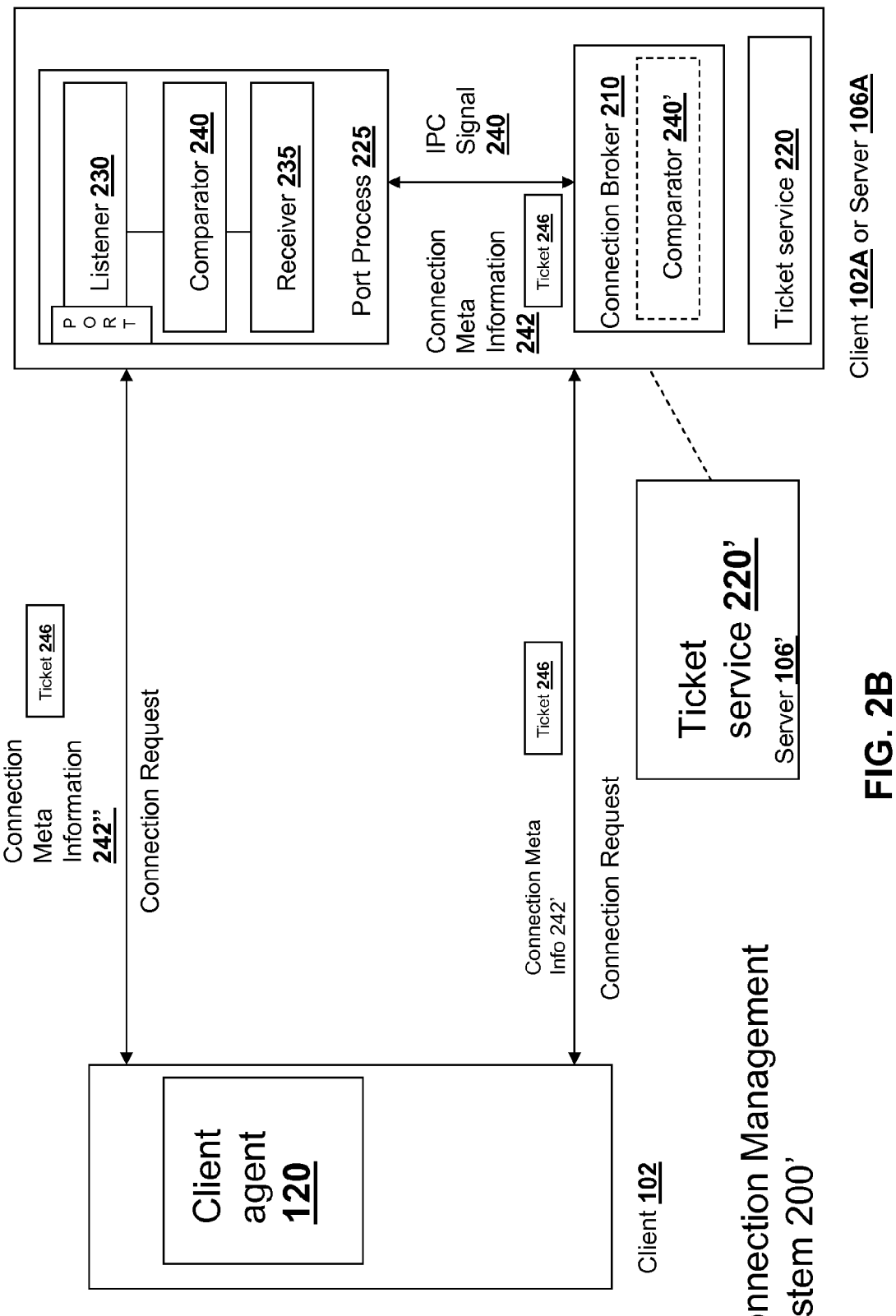
FIG. 2B is a block diagram of another embodiment of a system for establishing connections between devices.

Referring now to FIG. 2B, another embodiment of the connection management system 200' is depicted. In this embodiment, the first process of the port process 225 and the second process of the connection broker 210 may be deployed on the same device. In brief overview, system 200' includes a connection broker 210 and a port process 225 on the device of a client 102A or server 106A to which the client 102 may request a connection. The comparator 240 may be deployed as part of the port process 225 or the connection broker 210. The connection broker 210 may use a ticket service 220 on the same device or otherwise accessible on another device via a network. The connection broker 210 authorizes and identifies connections for which the port process 225 should enable the listener 230 to listen for. The connection broker 210 and the port process 225 may communicate via IPC signal 240 designed and constructed for interprocess communications between processes on the same device. In other embodiments, the connection broker 210 and the port process 225, or any portions thereof, are designed and constructed to embody the same process or processes.

In overview of the operations of the embodiment of the system 200' of FIG. 2B, a client 102 may request a connection to the device of client 102A or server 106A. For example, the client agent 120 may transmit a connection request to this device and/or to the connect broker 210. The connection broker 210 receives the connection request from the client 102. The connection broker 210 performs authentication and/or authorization of the request. If the request is authenticated and authorized, the connection broker generates connection meta information 242'. The connection broker 210 may forward this connection meta information 242' to the client 102. The client agent 120 may use this connection meta information to transmit a connection request to the port of the port process 225. The connection broker 210 also communicates a signal 240 to the port process 225, such as via receiver 235. In some cases, the connection broker 210 provides the port process 225 with the connection meta information 242 forwarded to client 102 and expected in the incoming connection request from the client 102.

In response to the signal from the connection broker 210, the port process 225 enables the listener 230 to listen on the port for an incoming connection request. The listener 230 may listen only for a predetermined time period for an incoming request. Upon receipt of the incoming connection request from the client 102, the port process 225 disables the listener 230 for listening for further connection requests. The port process 225 may determine if the received connection request is the same as the connection authorized and identified by the connection broker 210. A comparator 240 of the port process 225 or a comparator 240' of the connection broker 210 may used to compare the received connection meta information to the expected connection meta information. If the received connection is as expected, the port process 225 establishes the connection to the client 102. Otherwise, the port process 225 may drop or otherwise not establish the connection to the client 102.

Figure 2C:
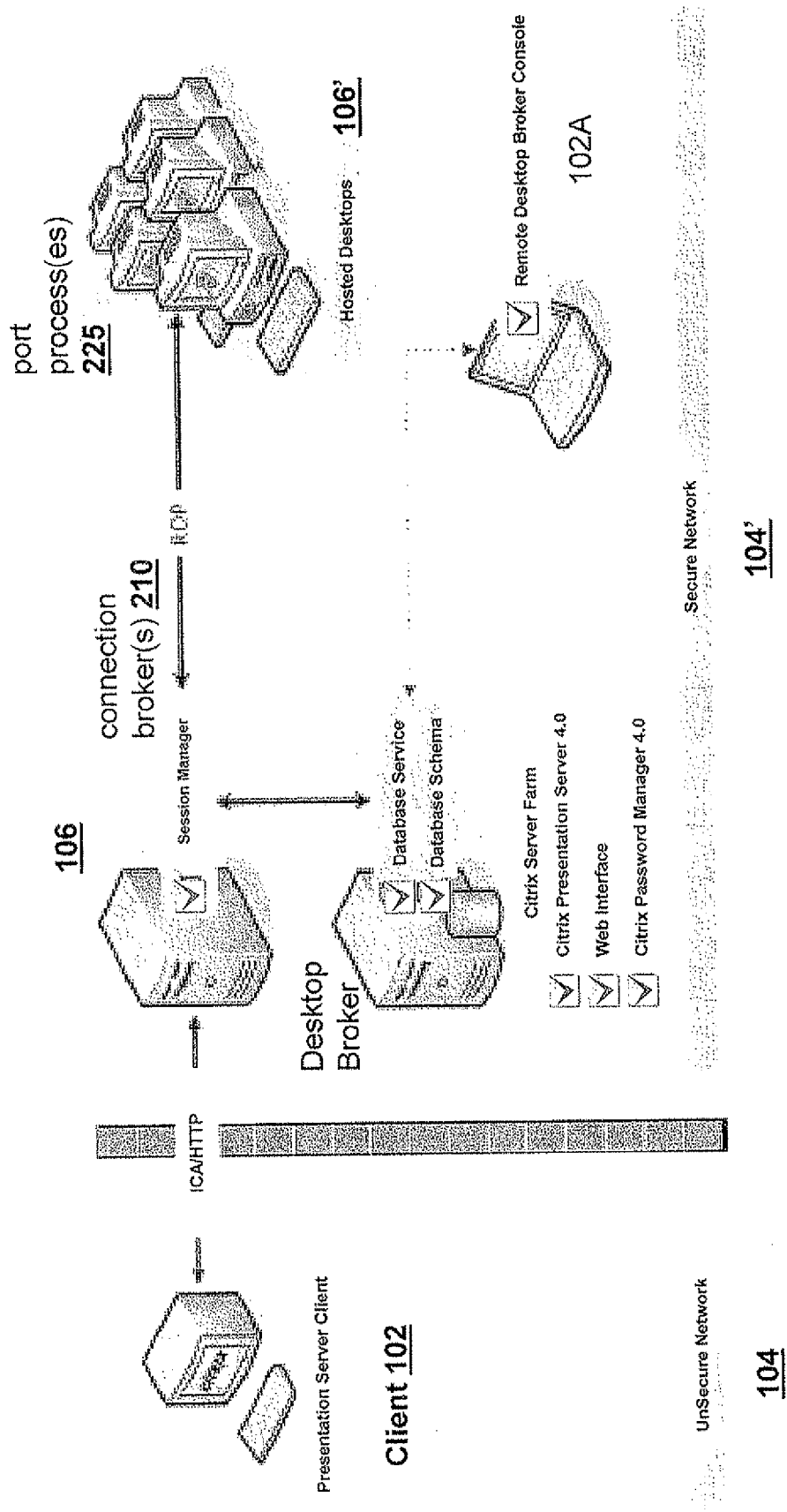
FIG. 2C is a block diagram of example embodiment of a system for establishing connections between devices for accessing hosted desktops.

Referring now to FIG. 2C, another example embodiment of the connection management system 200" is depicted. This example is directed towards an embodiment of a system including a Citrix Presentation Server farm. In the depicted environment of FIG. 2C, a Citrix Presentation Server system may be deployed with the Citrix Desktop Broker manufactured by Citrix Systems, Inc to centrally deploy and manage desktop environments in a data center. For example, a desktop environment, such as Windows XP workstations, referred to as hosted desktops, may be hosted in the data center and published using Citrix Presentation Server or Desktop Server. A Desktop Broker provides the management interface between the clients and the hosted desktops. The environment of FIG. 2C with the Desktop Broker provide a virtual work environment for users who need or desired access to a hosted desktop environment that provides a user experience similar to having a dedicated, physical workstation on their desktops. Users can connect, using thin terminals or computer running a Web browser and an ICA client and access these hosted desktops just as they would a published application.

In brief overview of the system 200" of FIG. 2C, a client 102 includes a Presentation Server client, such as an ICA client 120, a Citrix Presentation server farm 38 and one or more hosted desktops on one or more servers 106'. The Citrix Presentation Server farm 38 may also include one or more Web Interface services as well as the Citrix Password Manager, both manufactured by Citrix Systems, Inc. The system 200" also includes a Desktop Broker for providing session management and an interface to the hosted desktops and Citrix Presentation server farm. The Desktop Broker may be configured or administrated via a console application on a computing device or client 102A.

The Desktop Broker may provide access and interface services to one or more clients accessing the Citrix Presentation Server farm 38 and hosted desktops 106'. The Desktop Broker may include a database scheme, database service and a session manager. The database service comprises a management component managing database transactions and providing connection details for hosted desktops to the Session Manager in the system. The database services uses the information in the database to provide the functionality of machine brokering and session management. The database schema creates and initializes database tables required by the Database Service. The Session Manager comprises a component used to launch a hosted desktop connection through Presentation Server. The session manager interfaces with the database service to select a hosted desktop. The session manager may also exchange information with the database service about a current state of a hosted desktop connection. A Desktop Broker console may provide a user interface to the database. System administrators may use the console to create, update, or delete entries for hosted desktops in the database. The Desktop Broker Console may provide an interface to check status of hosted desktop connections and take appropriate actions, if required.

Although the environment or architecture depicted in FIG. 2C may generally be described as a Citrix Presentation Server environment and/or a Citrix Desktop Server environment, the environment or architecture of FIG. 2C may include any of the server and desktop virtualization technologies of Xensource, Inc. of Palo Alto, Calif., acquired by Citrix Systems, Inc. In some embodiments, the environment of FIG. 2C may use a product embodiment of Citrix Systems, Inc. incorporating Xensource technologies, which may be referred to as Xen Desktop.

In operation of an embodiment of system 200", a brief overview of steps to establish a connection to a hosted desktop through the Desktop Broker will be described. A user on client 102 opens a Web browser to access the Web Interface logon page and enters his or her user credentials. In other embodiments, the user may logon through a Program Neighborhood or a Program Neighborhood Agent interface manufactured by Citrix Systems, Inc. If authentication is successful, the system may present a list of hosted desktops to which the authenticated user has access. For example, the session manager of the Desktop Broker may authenticate the user. The user may select a hosted desktop to which to connect. For example, the user may click a user interface element representing an available hosted desktop in a web page of the browser. In response to the user's selection, the client agent 120 transmits a connection request to the Desktop Broker.

In response to receiving a connection request, the Desktop Broker transmits an ICA file to the client 102. The client agent 120 uses the ICA file to establish an ICA session to Presentation Server. A session manager is launched within the user's ICA session on a Presentation Server. The session manager contacts the database service and requests connection details to the specified hosted desktop. The database service returns connection details for the specified hosted desktop to the session manager. The session manager launches an RDP client and passes the RDP client the connection details for the hosted desktop. The RDP client connects to the hosted desktop specified and starts an RDP session. The session manager informs the database service that the user has successfully logged on to the hosted desktop and a session is in progress.

When a user logs out from the hosted desktop session, the hosted desktop is released and made available. In response to the user logging off from the hosted desktop, the system logs off the user from RDP session. The session manager informs the database service about the logoff event and the hosted desktop is released. The database service updates the status of the hosted desktop as idle/available. The session manager terminates the ICA session.

The systems and methods of the selective listening and connection meta information techniques described above in conjunction with FIGS. 2A-2B may be used in the example embodiment of FIG. 2C. In this embodiment, any server of the Desktop Broker or Citrix Presentation server farm 38 may include one or more connection brokers 210. Any of the servers 106' hosting a hosted desktop may include one or more port processes 225. In this scenario, the Desktop Broker handles the brokering of connections, and authentication of clients. When the Desktop Broker determines that a received request for an ICA connection is authenticated/authorized and may be provided via a given hosted desktop, the connection manager 210 communicates the signal 240 to enable the port process 225 on the server 106' providing the hosted desktop. In this manner, ports of the hosted desktop are selectively listened for expected and authorized connection requests identified by a second process, e.g., the connection broker 210. This reduces the attack surface of ports of the servers 106'.

Figure 3:
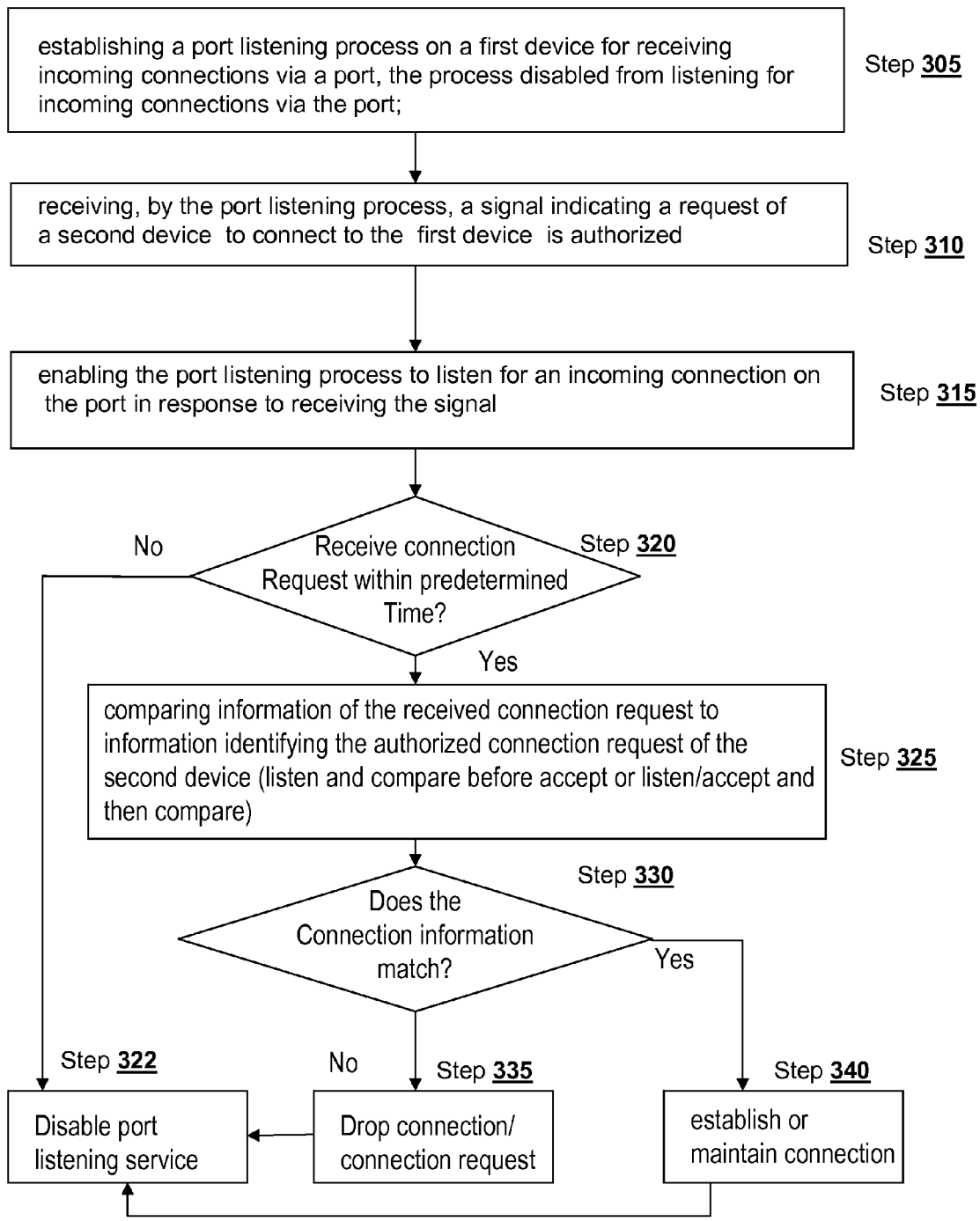
FIG. 3 is a flow diagram depicting an embodiment of steps of a method for establishing connections between devices.

Referring now to FIG. 3, an embodiment of steps of a method for selectively listening and establishing connections via the connection management system is depicted. In brief overview of method 300, at step 305, a port process 225 is established on a first device for receiving incoming connections requests via a port. The port process 225 is disabled from listening on the port. At step 310, the port process 225 receives a signal 240, such as a from a second process, e.g., the connection broker 210. The signal indicates a request of a second device to connect to the first device is expected. At step 315, the port process 225 is enabled to listen for an incoming connection request in response to receiving the signal. At step 320, the port process 225 determines if a connection request is received within a predetermined time. If the timeout period expires, at step 322, the port process stops listening for incoming requests. If a connection request is received within the predetermined time period, at step 325, the connection information of the received connection request is compared to the connection information of the authorized connection request of the second device. If, at step 325, the connection information does not match or otherwise identify the authorized connection, the port process 225 may drop the connection request or otherwise not establish the requested connection at step 335. If, at step 325, the connection information identifies the authorized connection, the port process, at step 340 may establish the connection in response to the request. At step 340, the port process 225 may disable listening on the port after receiving the expected connection request.

In further details, at step 305, the port process 225 may be established at any time prior to, during or in response to the client's connection request. In one embodiment, the port process 225 is established by an administrator upon the deployment or configuration of a server. In some embodiments, the port process 225 is established and running as a service upon installation of the port process 225. In another embodiment, the connection broker 210 initiates the execution of the port process 225 upon receipt of a connection request. In one case, the port process 225 service is running but by default the port listener 230 is disabled, idle or inactive. In another case, the connection broker 210 sends a signal to the port process 225 to disable the port listener 230. In other cases, the port listener 230 is configured to be disabled or otherwise not listening for connection requests on a port at a predetermined schedule or time, based on any type and form of temporal configuration. In some embodiments, an administrator configures or directs the port process to disable port listening 230 until a signal 240 is received.

At step 310, the port process 225 may enable port listening 230 upon receipt of any type and form of signal 240. The receiver 235 of the port process 225 may receive or otherwise obtain the signal 240. In one embodiment, the port process 225 receives the signal from a connection broker 210. In some embodiments, the received signal 240 indicates an incoming connection requested is expected to be received by the port process 225. In one embodiment, the signal 240 indicates a time period for which to expect the incoming connection request. In another embodiment, the signal 240 indicates the port for which to expect the incoming request. In other embodiments, the connection broker 210 communicates one or more signals 240 to the port process 225. The connection broker 210 may also communicate via a signal 240 any connection meta information 242. In another embodiment, the connection broker 210 may communicate via the signal 240 a ticket. In some embodiments, the signal 240 indicates the expected incoming connection request is authorized or allowed. The signal 240 may indicate that only a connection request from a predetermined client or source is authorized.

At step 315, in response to the signal, the port process 225 may enable the listener 230 to listen on a port. The listener 230 may listen on a port for any type and form of transport layer connection request, such as a TCP or UDP connection request. In other embodiments, the listener 230 may listen on a port for any type and form of application layer or session connection request. In some embodiments, the port process 225 enables the listener 230 to listen for incoming connection requests. In other embodiments, the port process 225 enables the listener to listen on a predetermined or specified port. In another embodiment, the port process 225 enables the listener to listen for a predetermined time period. In one embodiment, the port process 225 enables the listener to listen on a port until a connection request is received. In some embodiments, the port process 225 may enable the listener 230 or multiple listeners to listen on a plurality of ports. In other embodiments, one or more signals 240 may trigger a plurality of port processes 225 to enable listening on one or more ports.

At step 320, the port process 225 listens on the port for the incoming expected connection request until the connection is received and/or a predetermined time period expires. In one embodiment, the client 102 transmits a connection request to the port within the predetermined time period. In some embodiments, although the connection request from a client is expected, the client 102 may not transmit the connection request. In other embodiments, although the client transmits the connection request to the port there may be a delay in delivery of the request. In these embodiments, the time to deliver the request may be beyond the timeout period of the listener. In yet another embodiment, the port process 225 receives a communication on the port other than a connection request or other than an expected communication. In some embodiments, the listener 230 receives network communications other than the expected connection request during this time period. The listener 230 and/or port process 225 may either consume or drop these communications. In other embodiments, the listener 230 does not receive any network communication on the port during the predetermined time period.

In one embodiment, the listener 230 receives an unexpected connection request, drops the request, and waits for another connection request until the predetermined time period expires. In another embodiment, the port process 225 and/or listener 230 may receive a signal from another process, such as the connection broker 210 to inform the port process 225 to stop listening immediately. In one case, the port process 225 may drop any connections or connection requests in response to this signal. In another case, the port process 225 maintains established connections in response to the signal but immediately stops listening for any new connection requests.

If a connection request is not received within the predetermined time period, at step 322, the port process 225 may disable the listener 230 from continuing to listen on the port. In some embodiments, the port process 225 disables the listener 230 indefinitely. In other embodiments, the port process 225 disables the listener 230 until another signal 240 is received. In one embodiment, the port process 225 disables the listener 230 for a predetermined time period. In yet another embodiment, the port process 225 disables the listener 230 until an administrator configures, set or attends to the port process 225.

If a connection request is received by the listener 230, such as within the predetermined time period, at step 325, the port process 225 compares connection information of the received connection request with connection information of the identified and authorized connection request. In some embodiments, the port process 225 performs this comparison prior to accepting the connection request. In other embodiments, the port process 225 performs this comparison after accepting the connection or otherwise establishing the requested connection. In one embodiment, the port process 225 receives from the requesting device connection meta information 242", such as a ticket 246. In other embodiments, the port process 225 receives expected connection meta information 242 from a connection broker 210. In another embodiment, the port process 225 uses as connection meta information 242" of the connection request any available information from the network packet of the request, such as the IP address of the client. The port process may use, interface with or communicate to a comparator 240 to compare a first set of connection information of the received connection request to a second set of connection information of the expected connection request. For example, the comparator 240 may compare a first ticket generated via the connection broker 210 with a second ticket received by the connection request from the client 102. In some cases, the comparator 240 may include or be a ticket service 220 to verify or validate a ticket or connection meta information of the received connection request.

At step 330, the port process 225 determines whether or not the received incoming connection request is the expected and/or authorized connection request. In some embodiments, the port process 225 determines whether or not the connection request corresponds to an identified and authorized connection request of the connection broker 210. In one embodiment, the port process 225 determines at least a portion of the received connection meta information of the connection request matches a portion of the connection meta information of the expected connection request. In other embodiments, the port process 225 only determines the received connection request is the expected or authorized connection request if the connection meta information matches exactly.

If at step 330, in response to the comparison of step 325, the connection information is determined to not identify the expected or authorized connection request, the port process 225 at step 335 may drop the request or otherwise not establish the connection. In another embodiment, if the port process 225 accepted and established the connection, the port process 225 may at step 335 drop the established connection in response to the determination. In some embodiments, the port process 225 communicates an error reply to the requestor. In one embodiment, the port process 225 communicates any type and form of alert, alarm or event to indicate a receipt of an unexpected or unauthorized connection request. In other embodiments, the port process 225 may establish the connection for the unexpected request if the request matches or is allowed in accordance with any policies of a policy engine. In another embodiment, the port process 225 may establish the connection and request authentication credentials or certificates from the requesting client. The process 225 may establish the connection and request authorization from the connection broker 210. In these cases, if the connection is not authorized, the port process 225 may break, teardown or de-establish the connection. Upon dropping the connection request or discontinuing the connection, the port process 225 may disable the port listening service in accordance with step 322.

If at step 330, in response to the comparison of step 325, the connection information is determined to identify the expected or authorized connection request, the port process 225 may establish the connection at step 340. For example, the port process 225 may make this determination prior to accepting the connection request. In another embodiment, if the port process 225 accepted and established the connection, the port process 225 may at step 340 continue to maintain the established connection. In some embodiments, the port process may establish and/or maintain the connection for a predetermined time period, such as in accordance with policy or the authorization provided by a connection broker 210. In other embodiments, the port process 225 may establish and/or maintain the connection until the client requests to terminate the connection. In one embodiment, the port process 225 may establish and/or maintain the connection until receiving a signal 240 from the connection broker 210. In another embodiment, the port process 225 may establish and/or maintain the connection until the client is detected to be idle over the connection for a predetermined time period.

Upon establishing the connection at step 340, the port process 225 may disable the port listening service at step 322. The port process 225 may disable the listener 230 from listening on any other ports other than the port for the established connection or a port enabled responsive to the signal 240. The listener 230 may continue to listen for network communications via the established connection. In other cases, another process or portion of the port process takes over from the listener 230 communication handling for the established connection.

In view of the structure, functions and operations of the systems and methods described herein, the connection management system of the present solution reduces the attack surface of the server by selectively opening a server port for listening when a client has been authenticated and/or authorized, and directed to connect to the server. At other times, the first process of the server does not listen for connections. By selectively listening for connections, the server reduces the opportunity for hackers to attack the server process, and improves the security of the server. By using connection meta information to identify authorized connections, the connection management system further reduces the attack server by only allowing authorized end points to connect via selectively opened ports.

What is claimed:

1. A method for improving security by selectively listening on a port for a connection request in response to a signal identifying an expected authorized connection request, the method comprising the steps of:

(a) establishing a first process on a first device for receiving incoming connections via a port, the first process disabled from listening for incoming connections via the port;

(b) receiving, by the first process from one of a third device or a second process on the first device, a signal indicating a connection request to be sent by a second device to connect to the first device is authorized, the signal comprising information identifying the authorized connection request to be sent by the second device;

(c) enabling the first process to listen for an incoming connection on the port in response to receiving the signal; and (d) determining, by the first process, a connection request received on the port while the first process is enabled to listen on the port comprises connection information that either corresponds to the information of the first signal or does not correspond to the information of the first signal, is from the second device, responsive to comparing connection information of the connection request to the information of the signal identifying the authorized connection request of the second device, and respectively accepts or drops the received connection request.

2. The method of claim 1, wherein step (d) comprises determining, after accepting a connection for the received connection request, that the received connection request comprises connection information corresponding to the information of the signal and in response to the determination, maintaining, by the first process, the connection.

3. The method of claim 1, wherein step (d) comprises determining, after accepting a connection for the received connection request, that the received connection request comprises connection information that does not correspond to the information of the signal and in response to the determination, dropping, by the first process, the connection.

4. The method of claim 1, further comprising receiving, by one of a second process on the third device or the second process on the first device, on one of the first device or a third device a request from the second device to connect to the first device.

5. The method of claim 4, comprising authenticating, by the second process on the third device or the second process on the first device, the connection request and determining, by the second process, that the second device is authorized to connect to the first device.

6. The method of claim 5, comprising communicating, by the second process on the third device or the second process on the first device, the signal to the first process in response to the determination that the second device is authorized.

7. The method of claim 1, wherein step (c) comprises listening, by the first process, on the port until one of the connection request is received or an expiration of a predetermined time period.

8. The method of claim 1, comprising disabling listening, by the first process, for incoming connection requests on the port upon an expiration of a predetermined time period without receiving an authorized connection request.

9. The method of claim 1, wherein step (b) comprises receiving by the first process, information comprising a ticket from the second device, and step (d) comprises comparing, by one of the first process or one of a second process on the third device or the second process on the first device, a second ticket of the received connection request with the ticket.

10. The method of claim 9, further comprising determining, by the first process, to one of maintain a connection for the received connection request if the second ticket and the ticket match or drop the connection of the received connection request if the second ticket and the ticket do not match.

11. A system for improving security by selectively listening on a port for a connection request in response to a signal identifying an expected authorized connection request, the system comprising:
- a first process on a first device for receiving incoming connections via a port, the first process disabled from listening for incoming connections via the port;
- a receiver of the first process for receiving a signal from one of a third device or a second process on the first device indicating a connection request to be sent by a second device to connect to the first device is authorized, the signal comprising information identifying the authorized connection request to be sent by the second device;
- a listener of the first process enabled to listen for an incoming connection on the port in response to receiving the signal; and
- a comparator to determine a connection request received on the port while the listener is enabled to listen on the port comprises connection information that either corresponds to the information of the first signal or does not correspond to the information of the first signal is from the second device, responsive to comparing connection information of the connection request received on the port to the information of the signal identifying the authorized connection request of the second device, and wherein the first process respectively accepts or drops the received connection request.

12. The system of claim 11, wherein the first process determines after accepting a connection for the received connection request that the received connection request comprises connection information corresponding to the information of the signal and in response to the determination maintains the connection.

13. The system of claim 11, wherein the first process determines after accepting a connection for the received connection request that the received connection request comprises connection information that does not correspond to the information of the signal and in response to the determination drops the connection.

14. The system of claim 11, further comprising one of a second process on the third device or the second process on the first device a second process on one of the first device or a third device receiving the request from the second device to connect to the first device.

15. The system of claim 14, comprising the second process on the third device or the second process on the first device authenticating a connection request of the second device and determining that the second device is authorized to connect to the first device.

16. The system of claim 15, wherein the second process on the third device or the second process on the first device communicates the signal to the first process in response to the determination that the second device is authorized.

17. The system of claim 11, wherein one of a second process on the third device or the second process on the first device one of the first device or a third device includes the comparator.

18. The system of claim 11, wherein the listener of the first process listens on the port until one of the connection request is received or an expiration of a predetermined time period.

19. The system of claim 11, wherein the listener is disabled upon an expiration of a predetermined time period without receiving an authorized connection request.

20. The system of claim 11, wherein the receiver receives information comprising a ticket for the second device and the comparator of one of the first process or one of a second process on a third device or the second process on the first device compares a second ticket of the received connection request with the ticket.

21. The system of claim 20, wherein the first process determines to one of maintain a connection established for the received connection request if the second ticket and the ticket match or drop the connection if the second ticket and the ticket do not match.

22. A method for improving security by selectively listening on a port for a connection request in response to a signal identifying an expected authorized connection request, the method comprising:
- (a) establishing a first process on a first device for receiving incoming connections via a port, the first process disabled from listening for incoming connections via the port;
- (b) receiving, by the first process from one of a third device or a second process on the first device, a first signal indicating a connection request by a second device to connect to the first device is authorized, the signal comprising information identifying the authorized connection request to be sent by the second device;
- (c) enabling the first process to listen for an incoming connection on the port in response to receiving the first signal;
- (d) receiving, while the first process is enabled to listen on the port, a connection request on the port;
- (e) determining the received connection request is from the second device, responsive to comparing connection information of the connection request to the information of the signal identifying the authorized connection request of the second device; and
- (f) either accepting, by the first process, the received connection request if the connection request comprises connection information corresponding to the information of the first signal, or dropping, by the first process, the received connection request if the connection request does not comprise connection information corresponding to the information of the first signal.

* * * * *